March 21, 1939. R. G. FERRIS 2,151,590
HANGER
Filed May 24, 1937
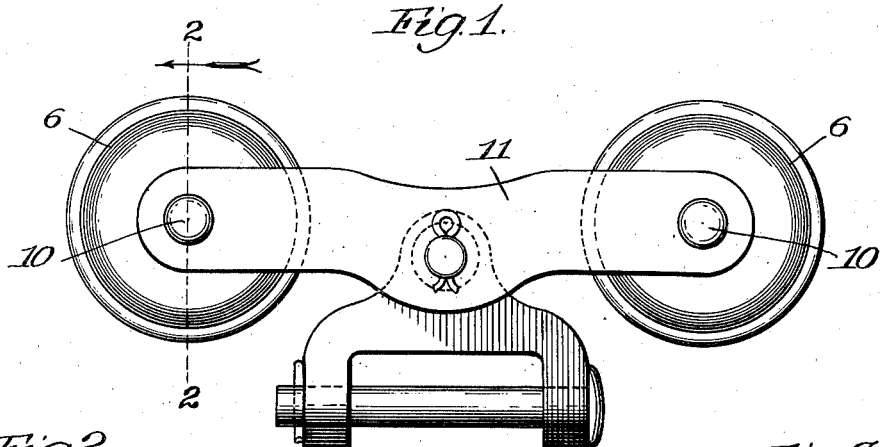
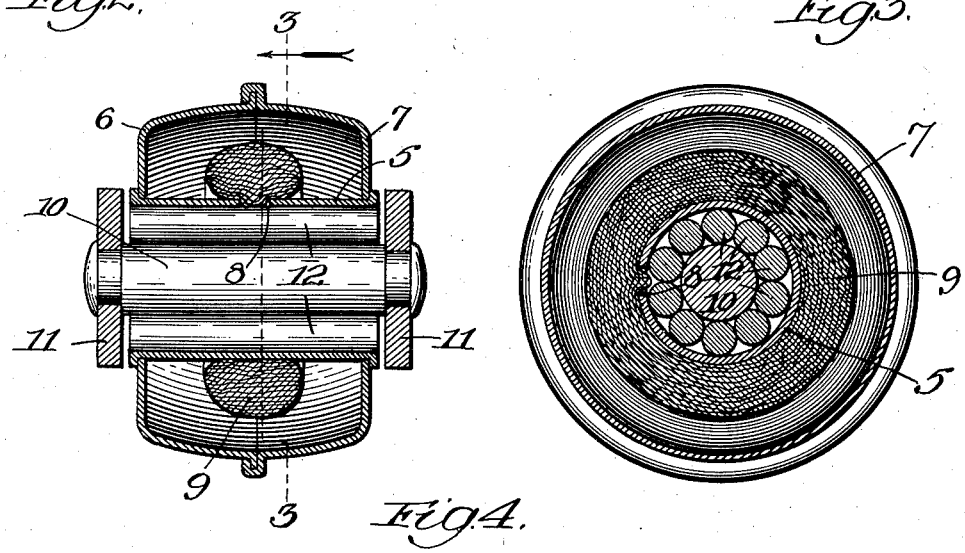
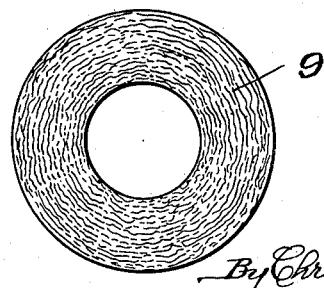
Inventor:
Robert G. Ferris,
By Chritton, Wiles, Davies, Hirschl & Dawson,
Attys.

Patented Mar. 21, 1939

2,151,590

UNITED STATES PATENT OFFICE 2,151,590

HANGER

Robert G. Ferris, Harvard, Ill., assignor to Starline, Inc., a corporation of Illinois Application May 24, 1937, Serial No. 144,497

1 Claim. (Cl. 16—98)

This invention is an improvement in barn door hangers, and is fully described herein and illustrated in the accompanying drawing, in which:

Figure 1 is a side elevation of the hanger; Figure 2 is a vertical transverse section on the line 2—2 of Figure 1; Figure 3 is a vertical longitudinal section on the line 3—3 of Figure 2; and Figure 4 is a side elevation of the lubricating washer.

The invention is here illustrated as applied to a hanger of the type shown in the Minshull Patent 1,010,781, granted December 5, 1911. It can, however, be applied to other types of hangers.

The door hanger wheel comprises a tubular hub portion 5 and two tread forming cupped portions 6 and 7 outwardly turned along their meeting line. The cupped portions are slipped over the tubular hub part 5, and the ends of the latter are upset as illustrated. The outwardly turned flange on the tread forming portion 7 is turned over the corresponding flange of the part 6 to make a firm wheel.

The tubular hub portion 5 is perforated at 8, and prior to assembling of parts a felt washer 9, which fits very tightly on the tubular hub, is forced over the same so as to register with the perforation 8. This felt washer is saturated with a suitable lubricant and is so compressed over the hub portion as to bulge through the perforation as illustrated and contact the rollers of the bearing hereafter described so that the lubricant gradually works out in small quantities and keeps the hanger adequately lubricated for a long period.

The bearing structure is clear from the drawing. It consists of an axle pin 10 extending between the side plates 11 of the hanger, and the annular space provided between it and the tubular hub portion 5 of the wheel affords space for the friction rollers 12.

The device herein illustrated provides lubricating means at a very low cost and means which is built into the structure before it is assembled.

The present invention can be applied to hangers of a somewhat different type, in fact to any of those types wherein the roller bearing construction is surrounded by a permanently swedged annular structure in which the lubricating washer can be placed prior to assembly. In the present type of hangers this space is provided within the wheels themselves.

I claim as new and desire to secure by Letters Patent:

A barn door hanger having a roller bearing structure including: a central pin; a perforated tubular member surrounding the pin and spaced therefrom; a series of rollers in the space between the pin and the tubular member; a closed annular chamber around the tubular member; and an endless fibrous washer in the annular chamber stretched over the tubular member and lying over the perforation therein, said washer being of such length, compressibility and elasticity that it will be held in place by friction and extrude a portion of itself through said perforation into contact with said rollers.

ROBERT G. FERRIS.